United States Patent [19]

Schultheiss et al.

[11] Patent Number: 4,642,300

[45] Date of Patent: Feb. 10, 1987

[54] METHOD FOR AVOIDING OR REDUCING THE INTERACTIONS AND THEIR CONSEQUENCES FROM CONTACT OF HOT LIQUID METALLIC SODIUM WITH CONCRETE

[75] Inventors: Georg Schultheiss, Luneburg-Odeme; Charles von Minden, Hamburg; Hans W. Fritzke, Geesthacht, all of Fed. Rep. of Germany

[73] Assignee: GKSS Forschungszentrum Geesthacht GmbH, Geesthacht, Fed. Rep. of Germany

[21] Appl. No.: 626,477

[22] Filed: Jul. 2, 1984

Related U.S. Application Data

[63] Continuation of Ser. No. 435,336, Oct. 19, 1982, abandoned.

[30] Foreign Application Priority Data

Oct. 21, 1981 [DE] Fed. Rep. of Germany ....... 3141726

[51] Int. Cl.$^4$ ..................... C04B 35/02; C04B 35/04; C04B 35/10; C04B 35/48
[52] U.S. Cl. ................................... 501/124; 376/295; 376/300; 376/900
[58] Field of Search .................. 501/124; 106/104, 86; 376/305, 290, 295, 280, 900; 52/224, 249, 612, 410

[56] References Cited

U.S. PATENT DOCUMENTS

| | | | |
|---|---|---|---|
| 3,802,894 | 4/1974 | Prost et al. | 106/104 |
| 3,984,282 | 10/1976 | Kleimola | 376/282 |
| 4,033,782 | 7/1977 | Ray et al. | 106/104 |
| 4,036,688 | 7/1977 | Golden et al. | 376/280 |
| 4,055,437 | 10/1977 | Petrak | 106/104 |
| 4,148,663 | 4/1979 | Holcombe | 106/105 |
| 4,226,676 | 10/1980 | Barnes | 376/290 |
| 4,348,236 | 9/1982 | Hines et al. | 501/124 |
| 4,366,209 | 12/1982 | Babcock | 106/104 |
| 4,400,474 | 8/1983 | Copperthwaite et al. | 501/124 |
| 4,473,528 | 9/1984 | Kleimola | 376/282 |

FOREIGN PATENT DOCUMENTS 3141726 4/1983 Fed. Rep. of Germany .

OTHER PUBLICATIONS

Chapman, R. H., "Equipment Cell Liners for Liquid—Metal—Cooled Fast Breeder Reactors", Nuclear Safety, vol. 17, No. 2, 1976, (pp. 208 to 215).
Polentz, L. M., "A New Approach to the Design of LMFBR Liners", Nuclear Engineering International, vol. 25, (Nov. 1980), No. 306, (pp. 56 to 59).
Singh, R. N., "Compatibility of Ceramics with Liquid Na and Li", J. Am. Cer. Soc. 59(3-4), 1976, (pp. 112-115).
Hoppe, F., "Brandverhalten von Natrium and daraus abzuleitende Schutzmassnahmen am Beispiel des KKW Kalkar", in translation, Combustion Behavior of Sodium and Protective Measures Derived Therefrom for the Example of the KKW [nuclear power plant] Kalkar, AED—Conf—77—304—002, pp. 8 to 11, of pp. 1-5 (German), (1977, Essen).
Kordina, K., et al, "Moisture Transport and Vapor Release of Concrete Structures at Temperatures >100° C.", Transactions of the 5th International Conference on Structural Mechanics in Reactor Technology, Paper H 1/5, Berlin, Aug. 13-17, (1979), 1 page, English Summary, 8 pages, (German), See p. 2.
Chapman, R. H., "State of the Art Review of Equipment Cell Liners for LMFBR's", ORNL-TM-4714, (1975), pp. 1-85, See pp. 3-6, 28-38, 56, 58-59.
Hans—Gunter Feldhaus, Feuerfeste Stoffe in der Stahl—und Eisengiesseri, 1970, pp. 75 to 77 and 125.

Primary Examiner—Helen M. McCarthy
Attorney, Agent, or Firm—Sughrue, Mion, Zinn, Macpeak and Seas

[57] ABSTRACT

A method and an apparatus for avoiding or reducing the interactions and their consequences from contact of hot liquid metals with concrete. At least for the region of the concrete structure near the surfaces which may come into contact with the hot liquid metal, there is employed a concrete containing aluminum oxide, magnesium oxide, zirconium oxide, or a mixture thereof, in a proportion of 70% by weight to 96.5% by weight.

13 Claims, No Drawings

METHOD FOR AVOIDING OR REDUCING THE INTERACTIONS AND THEIR CONSEQUENCES FROM CONTACT OF HOT LIQUID METALLIC SODIUM WITH CONCRETE

This application is a continuation, of application Ser. No. 435,336, filed Oct. 19, 1982, now abandoned.

BACKGROUND OF THE INVENTION

The present invention relates to a method for avoiding or reducing the interactions and their consequences from contact of hot liquid metallic sodium with concrete in systems employing sodium cooling by use of refractory material.

Where there are leakages in heat transfer systems employing sodium cooling, it cannot be excluded that liquid metal may come into contact with structural parts made of concrete. The concrete is then subjected to high thermal, chemical and mechanical stresses which, due to mutual influences, lead to a complex reaction mechanism which is summarized by the term sodium-concrete interaction.

The changes in the characteristics of concrete as a result of thermal stresses are the result essentially of the release of water, which is present in the concrete in unbound form, and in physically as well as chemically bound form. Generally, two phenomena can be noted.

The first is a reduction of the strength of the concrete due to the deterioration of physical and chemical bonds between cement components and water. The second is a pressure increase in the concrete pores due to water evaporation and expansion of noncondensable gases with subsequent discharge of the water vapor from the heated concrete surface.

Exothermal chemical reactions occur between the sodium and released water vapor during the course of which hydrogen is formed. The deterioration of the concrete structure enhances the contact of sodium with solid concrete components which in part also react exothermally with sodium. The high mechanical stress to which the concrete is subjected due to thermal stresses and a build-up of internal vapor pressure lead to crack formation and chipping in the surface region. The advance of the reaction is accelerated thereby.

The safety related consequences of the interaction of sodium with concrete can be summarized as follows. Thus, there is a production of hydrogen, a release of energy, and an impairment of the load carrying capability of concrete structures.

Today, the major field of use of liquid metal technology are fast reactors that are cooled with sodium. Such systems are constructed exclusively from concrete and, in conformance with the graduated safety requirements in the primary and secondary regions of the systems, are equipped with various protective systems which in the case of malfunction are to prevent, inter alia, contact between sodium and concrete.

The protective systems described below are used in loop reactors, most of whose sodium conducting components are disposed in individual caverns or cells of the containment building. Depending on the design of the system, all or some of these containment cells are lined with steel sheets (cell liners) which are attached to the inner faces of the delimiting concrete structure. Depending on the degree of stress expected in cases of malfunction, the cell liners are given different structural features.

Significant stresses which occur in the case of leakage when employing a cell liner include thermal shock stresses upon the impingement of hot sodium. Further significant stresses which occur are due to different thermal expansions of the cell liner and of the concrete structures. Moreover, significant stresses occur as a result of a build-up of a steam pressure cushion between the liner and concrete structure due to evaporation of the concrete water as a result of heat conduction from the sodium pool into the concrete structure.

The build-up of a steam pressure cushion between the liner and concrete structure is of particular significance because the steam pressure cushion may lead to the liner being chipped off and even small damage points permit the discharge of large quantities of steam into the sodium region.

The following preventive measures are taken in the state of the art protective systems against direct contact between sodium and concrete or the release of concrete water, respectively:

(a) Fast sodium cooled breeder reactor (SNR 300). See, E. Hoppe, "Brandverhalten von Natrium and daraus abzuleitende Schutzmassnahmen am Beispiel des KKW Kalkar", in translation, "Combustion Behavior of Sodium and Protective Measures Derived Therefrom for the Example of the KKW [nuclear power plant] Kalkar", AED-Conf-77-304-002, pages 8 to 11; K. Kordina, U. Schneider, "Moisture transport and vapor release of concrete structures at temperatures >100° C., Transactions of the 5th International Conference on Structural Mechanics in Reactor Technology, Paper H 1/5, Berlin, Aug. 13-17, 1979 (page 2); R. H. Chapman, "State of the Art Review of Equipment Cell Liners for LMFBR's" ORNL-TM-4714 (page 56):

The inner surfaces of the inner containment enclosing the primary region are covered with a liner sheet of 6 mm thickness, which serves as a lost shell during the concrete pouring process. Presumably, a small gap forms already during reactor operation between the concrete surface and the liner which grows under the temperature stress caused by a malfunction and initially serves as the water collecting reservoir when water starts to evaporate from the concrete. The volume of this reservoir is relatively small, however, measured with respect to the developing vapor quantities, so that a pressure relief is installed to avoid undue pressure build-up. The evaporated concrete water is conducted through a pipeline system into a condenser. The cell liner system is supplemented by bottom troughs of steel which are arranged underneath the primary components for collecting the leaked sodium.

The sodium conducting components of the secondary system are essentially disposed outside of the containment structure in the three steam generating houses. Leakages are likewise collected in bottom troughs which in order to restrict sodium combustion in this noninert region of the plant, are provided with a special cover. The leaked sodium is conducted away from the collecting troughs into collecting tanks that have been made inert. In order to protect the bottom concrete against undue temperature increases, a heat shield is disposed underneath the collecting troughs. The wall surfaces in the steam generator houses are not protected.

(b) Fast Flux Facility. See R. H. Chapman, "State of the Art Review of Equipment Cell Liners for LMFBR's" (1975)ORNL-TM-4714 (pages 28 to 38); L. M. Polentz, "A New Approach to the Design of LMFBR Liners", Nuclear Engineering International, Volume 25 (1980), No. 306, (pages 56 to 59); R. H. Chapman, "Equipment Cell Liners for Liquid-Metal-Cooled Fast Breeder Reactors", Nuclear Safety, Volume 17, (1976) No. 2, (pages 209 to 211):

The fast flux test facility (FFTF) is a sodium cooled reactor with 400 MW thermal power which is to serve as prototype for large-scale commercial systems and for that reason represents the present state of the art.

All containment cells having sodium carrying components and assemblies are equipped with cell liners. Generally there are two liner systems, the hot liner and the cold liner. The installation of the hot liner is technologically more complicated and therefore more expensive than that of the cold liner. The hot liner is therefore used only in the lower region of some cells selected with a view toward safety. The structural height is essentially determined with a view toward the liquid metal level in a cell when there are large sodium leaks.

A significant feature of the hot liner is the multilayer structure of steel sheet, air gap and refractory material. The hot liner is fastened only at its junction with the cold liner so as to assure free expansion. Water vapor exiting from the concrete is conducted away through pipelines in order to prevent the build-up of a vapor pressure cushion. The hot liner is installed on the finshed-concrete structure, its use as formwork is not possible.

The cold liner system is used in the upper region of the cells equipped with the hot liners as well as in all other lined cells. A structure corresponding essentially to the containment structure of light water reactors, includes 6.35 mm thick steel sheets which are welded to supports that are embedded in the structural concrete as a grid structure (square grid 1.2×1.2 m).

The cold liner was originally installed without a pressure release system. Later examination of the design guidelines resulted in the subsequent installation of a pressure relief system in the reactor cavern.

A second concept for the cold liner which was later used during the structural phase was developed from the form work system for concrete structures. Prefabricated plate sections are positioned on the construction site and are welded together to serve as a permanent formwork for the concrete. In order to anchor the liner in the concrete structure, angle irons are arranged on the rear of the segments in a pattern of 0.3 m×0.3 m. In addition to the cell liners, a preventive measure against sodium leakage should be used according to which the arrangement of reactor vessel, primary circulating pump and intermediate heat exchangers are placed in free standing protective tanks. In some cases, pipelines, fittings and smaller components, particularly in the secondary region, are equipped with collecting troughs.

The protective effect of the known liner systems is based on the principle that direct contact of sodium with concrete as well as interaction due to water vapor transfer into the sodium region due to damaged portions in the liner must be prevented under all conceivable malfunction conditions. If the liner is damaged due to the stresses to be expected in connection with large sodium leaks, such as thermal shock stresses, thermally induced stresses between liner and structural concrete and build-up of a vapor pressure cushion between liner sheet and concrete, effective protection is no longer provided. This applies also to relatively small damaged portions, such as, for example, cracks in the weld seams through which, due to the drop in pressure, large quantities of water vapor can flow into the sodium region.

A comparison of the liner systems used, shows significant differences in important structural features. The primarily employed cold liner which rests directly on the concrete structure and is firmly connected therewith is compared to the much more complicated hot liner which is suspended to be freely movable in combination with a heat shield. This indicates that the assumed loads according to which the liner was designed obviously were widely divergent since, according to various safety reports, the respectively used liner system meets the set requirements. Confirmation is found in the publications of R. H. Chapman, "A State of the Art Review of Equipment Cell Liners for LMFNR's" ORNL-TM 4714 (pages 3 to 6, 58, and 59) and "Equipment Cell Liners for Liquid Metal Cooled Fast Breeder Reactors", Nuclear Safety, Volume 17, No. 2, pages 209 to 212, according to which no experimental tests have as yet been made with direct reference to the design of cell liners or to prove their functional capabilities in connection with large sodium leaks.

Further points of criticism in connection with these liner systems mentioned in the above references include the fact that the structual analysis used as the design instrument proves difficult particularly at the critical points of a cell liner, as, for example, at the junctions between wall and wall, wall and bottom and in the corners as well as at the passages of pipelines. These parts in particular, however, are subjected to the greatest stresses during malfunctions so that here a failure can be expected first.

A further criticism is in connection with layouts, in that in the layouts the liner systems are generally considered to be homogeneous surfaces. In practice, however, they have numerous weld seams and it must be assumed that the weld seams have a great influence on the stability of the liner.

Still another criticism is that the cell liner technology in the field of fast reactors with sodium cooling has not yet reached a state of development like the field of containment structures for water and gas cooled reactors, although concept and construction details have been substantially taken over from that field.

In summary, it must be noted that with respect to structure and proof of functional capability of liner systems, not all uncertainties have been completely eliminated, i.e. these systems are still in need of improvement.

It is notable that liners are mentioned only in connection with the description of containment systems and therefore their use seems to be confined to this field. In contradistinction thereto, however, approximately the same magnitude of sodium throughput as in the primary system can be encountered outside the containment system in the steam generators. The reasons for restriction of liner use to the primary region are probably the high costs for installation of such systems, the fact that the requirement for safe activity containment does not exist in the steam generator region, and the fact that the requirement for liner systems was seen originally primarily with a view toward gastight envelopment of the primary system which, in normal operation, is to permit the maintenance of an inert gas atmosphere and, in malfunction situations, constitutes a barrier against the discharge of activity.

Consequently, the requirement for a protective system against the sodium-concrete interaction in the secondary or steam generator region is not covered by the available iner systems.

SUMMARY OF THE INVENTION

It is an object of the present invention to provide a method and an apparatus for avoiding or reducing the interactions and their consequences from contact of hot liquid metals with concrete.

Another object of the present invention is to reduce the extent of the consequences with respect to safety measures in the interaction of liquid metal with concrete such as hydrogen production, energy release, and impairment of the load carrying capability of concrete structures.

Additional objects and advantages of the present invention will be set forth in part in the description which follows and in part will be obvious from the description or can be learned by practice of the invention. The objects and advantages are achieved by means of the processes, apparatus instrumentalities and combinations particularly pointed out in the appended claims.

To achieve the foregoing objects and in accordance with its purpose, the present invention provides a method for avoiding or reducing the interactions and their consequences from contact of hot liquid metallic sodium with concrete in regions of systems employing sodium cooling by use of refractory material, comprising providing, at least for the region of the concrete structure near the surface of the concrete structure which may come into contact with the hot liquid sodium, a protective concrete layer made of a material which is a concrete which contains aluminum oxide, magnesium oxide, zirconium oxide, or a mixture thereof, in a proportion of 70 percent by weight to 96.5% by weight.

Preferably, the material is a concrete produced of an alumina cement and lightweight firebrick (refractory concrete aggregate having a low heat conductivity) and/or firebrick (refractory concrete aggregate).

In another preferred embodiment of the present invention, the material can be concrete during whose production an air entraining (pore forming) agent and/or a concrete workability (liquefying) agent and/or a concrete permeability reducing (condensing) agent were added to the cement paste.

The present invention further provides an apparatus for avoiding or reducing the interactions and their consequences from contact of hot liquid metallic sodium with concrete in regions of systems employing sodium cooling by use of refractory material, comprising a protective layer of a concrete containing aluminum oxide, magnesium oxide, zirconium oxide, or a mixture thereof, in a proportion of 70% by weight to 96.5% by weight, disposed on the surface of the concrete structure.

The protective layer can be arranged on the concrete structure in the form of a plaster or in the form of prefabricated molded bodies.

The protective layer preferably comprises a concrete made of an alumina cement and lightweight firebrick (refractory concrete aggregate with low heat conductivity) and/or firebrick (refractory concrete aggregate). The protective layer can also be made of a concrete to whose cement paste has been added during its production an air entraining additive which forms air pores and/or a water reducing agent which liquefies, that is, increases the plasticity of freshly mixed concrete and/or a permeability reducing agent which reduces the concretes permeability to, and absorption of, water and thus can be said to condense the concrete.

An advantageous embodiment of the apparatus according to the invention is distinguished in that the protective layer is in the form of prefabricated molded bodies made of finished concrete parts which have been pretreated by firing, before installation, on the concrete structure they are to protect.

It is to be understood that both the foregoing general description and the following detailed description are exemplary, but are not restrictive of the invention.

DETAILED DESCRIPTION OF THE INVENTION

The present invention assures that a protective concrete layer is provided which contains solid components which react with sodium only in negligible amounts. The present invention further assures that the concrete protective layer loses only a slight degree of strength at high temperatures compared to normal concrete, and that the concrete has a heating damping effect due to its poor heat conductivity.

In order to meet these requirements, the concrete in the concrete protective layer of the present invention contains aluminum oxide, or magnesium oxide (MgO), or zirconium oxide, or a mixture of these substances, in an amount of 70% to 96.5% by weight. Aluminum oxide, or magnesium oxide (MgO), or zirconium oxide ($ZrO_2$) or a mixture of these substances, can be used as concrete aggregate to form the concrete. Moreover, in order to meet the above requirements, the present invention preferably employs cements which contain large portions of aluminum oxide ($Al_2O_3$). The stated substances are not reduced by sodium in the temperature range in question.

Moreover, these materials contain only small quantities of silicon oxide and iron oxides.

Cements which contain only very small quantities of silicon oxide and iron oxides include alumina cement. A preferred alumina cement contains up to 80.5% $Al_2O_3$ and 18.0% CaO, wherein 0.2% $SiO_2$ and 0.15 $Fe_2O_3$ together with other impurities constitute only a remainder of 1.5%.

The concrete aggregate of aluminum oxide, magnesium oxide, zirconium oxide, or mixtures thereof, can be provided by breaking so-called lightweight firebrick and/or from firebrick containing proportions of the above-mentioned oxides up to 99%.

Concretes based on alumina cement and the stated aggregates of aluminum oxide, magnesium oxide, zirconium oxide or mixtures thereof, can be used up to temperatures of about 1500° C. In a temperature range from 100° C. to 400° C., their strength drops to about 40 to 65% of their initial strength because in this temperature range there occurs the complete dehydration of the aluminates. With a further increase in temperature, the drop in strength is slowed down and, when heated to 600° C., there remains 38 to 64% of the initial strength and when heated to 800° C. there remain 36 to 60% of the initial strength. At temperatures above 100° C., a great increase in strength beyond the initial strength is noted which is a result of the material baking together or of a ceramic bond being formed, respectively. The concrete layer can therefore be made to be self-supporting.

By selecting concrete aggregate with poor heat conductivity, such as lightweight firebrick, and adding air pore forming additives to the cement paste, the heat conductivity of the concrete can be minimized so that it can be used as insulating concrete. In this way, a building constructed of conventional concrete is prepared against undue temperature stresses and their consequences such as a drop in strength and release of water vapor.

Moreover, the addition of concrete liquefying and condensing additives permits influencing the microstructure of the cement rock to the extent that a predominantly closed porosity is realized. In this way, the penetration of sodium into the protective layer and the discharge of water vapor from the concrete structure to be protected are essentially avoided.

For use of the concrete material of the present invention, there exists various conceivable possibilities. For example, the concrete can be applied as a plaster on the building structure of conventional concrete which is to be protected. In this case, the protective layer contains water as does any other concrete, which is released when heated and is able to react with sodium. The effects of the sodium-concrete interaction are restricted, however, because no solid components exist in the protective layer which react with sodium and contact of the sodium with conventional concrete is prevented. At the same time, the conventional concrete is thermally insulated.

Further, the concrete can be used in the form of an installation of a protective layer of finished components which are pretreated by firing. In this way, the water contained in the concrete is driven out completely and the originally existing hydraulic bond of the cement rock is converted to a ceramic bond of high strength.

The present invention offers an opportunity for supplementing the known protective systems in the containment area with a view toward improving nuclear safety.

The present invention is intended for use particularly in those cases where, for economical reasons, liner systems have previously not been employed, as, for example, in steam generating buildings or other regions of the secondary system of fast reactors with sodium cooling. The present invention can there reduce, by reducing the damage due to sodium leaks, the costs resulting from such events and incurred by repair and shutdown on the system.

The significant advantages of the present invention include the fact that the protective system on which the present invention is based can be produced and installed with the methods used in conventional concrete construction. It therefore has such advantages as simple and economical processing, suitability for complex geometries, and the possibility of building prefabricated parts.

Compared to conventional concrete, the concrete made on the basis of alumina cement additionally has the positive characteristic of hardening quickly in a normal setting time. The finished structures or components can therefore be subjected to loads or processed further after a short period of time.

The present invention affords an opportunity for use in the secondary region of sodium cooled reactors in which, due to the high costs involved, no liner systems have been used in the past. Moreover, the reliability of the liner systems in the primary region can be augmented if a layer of the described special concrete is disposed between the normal concrete and liner metal.

It will be understood that the above description of the present invention is susceptible to various modifications, changes and adaptations, and the same are intended to be comprehended within the meaning and range of equivalents of the appended claims.

What is claimed is:

1. In a method employing liquid metallic sodium as a cooling medium and having concrete structure wherein the liquid sodium, as hot liquid, metallic sodium can come in contact with, and interact with the concrete of the concrete structure, the improvement comprising providing a protective layer in contact with the concrete structure, at least for the region of the concrete structure near the surfaces that may come in contact with the hot, liquid, sodium to avoid or reduce the interactions and their consequences from cntact of the hot, liquid, metallic sodium with the concrete of the concrete structure, said protective layer being a protective concrete layer made of a concrete which consists essentially of only small quantites of silicon oxide and iron oxides, and in which aluminum oxide, magnesium oxide, zirconium oxide, or a mixture thereof is present in a proportion of 70% to 96.5% by weight, and wherein the concrete is made from a hydraulically hardened alumina cement and refractory concrete aggregate, said protective layer being suitable for sue in the secondary regions of sodium cooled reactors in which there may be no liner system and being suitable for augmenting the reliability of liner systems in the primary region of sodium cooled reactors.

2. Method as defined in claim 1, wherein the concrete of the of the protective layer is produced from the alumina cement and firebrick aggregate.

3. Method as defined in claim 2, wherein teh firebrick aggregate is lightweight firebrick aggregate.

4. Method as defined in claim 1, wherein the protective layer is in the form of prefabricated molded concrete bodies which have been treated before their installation on the concrete structure to be protected by firing to drive water completely out of the molded concrete bodies and form a ceramic bond in the molded concrete bodies.

5. Method as defined in claim 1, wherein the concrete of the protective layer is applied to the concrete structure to be protected in the form of a workable mixture which hardens on the concrete structure.

6. Method as defined in claim 1, wherein the alumina cement contains up to 80.5% $Al_2O_3$ and 18.0% $CaO$, and wherein 0.2% $SiO_2$ and 0.15 $Fe_2O_3$ together with other impurities constitute only a remainder of 1.5%.

7. In an apparatus containing a sodium cooling medium and a concrete structure, wherein the sodium cooling medium, as hot, liquid, metallic sodium, can contact and interact with the concrete of the concrete structure, the improvement conprising means for avoiding or reducing the interactions and their consequences from contact of the hot, liquid, metallic sodium with the concrete structure, the means comprising a protective layer in contact with the surface of the concrete structure, said protective layer being a protective concrete layer of a concrete consisting essentially of only small quantities of silicon oxide and iron oxides, and in which aluminum oxide, magnesium oxide, zirconium oxide, or a mixture thereof is present in a proportion of 70% to 96.5% by weight, and wherein the concrete is made from a hydraulically hardened alumina cement and refractory concrete aggregate, said protective layer being suitable for use in the secondary regions of sodium cooled reactors in which there may be no liner system and being suitable for augmenting the reliability of liner systems in the primary region of sodium cooled reactors.

8. Apparatus as defined in claim 7, wherein the protective layer is a concrete which has hardened in situ on the concrete structure.

9. Apparatus according to claim 7, wherein the protective layer is in the form of prefabricated molded concrete bodies.

10. Apparatus as defined in claim 9, wherein the prefabricated molded concrete bodies have been treated before their installation on the concrete structure to be protected by firing to drive water completely out of the molded concrete bodies and form a ceramic bond in the molded bodies.

11. Apparatus according to claim 7, wherein the concrete of the protective layer is produced from the alumina cement and firebrick aggregate.

12. Apparatus according to claim 11, wherein the firebrick aggregate is a lightweight firebrick aggregate.

13. Apparatus as defined in claim 7, wherein the alumina cement contains up to 80.5% $Al_2O_3$ and 18.0% CaO, and wherein 0.2% $SiO_2$ and 0.15 $Fe_2O_3$ together with other impurities constitute only a remainder of 1.5%.

* * * * *